United States Patent [19]
Kozel

[11] Patent Number: 5,840,399
[45] Date of Patent: Nov. 24, 1998

[54] CONSTRUCTION OF ARTICLES OF MANUFACTURE OF FIBER REINFORCED STRUCTURAL COMPOSITES

[76] Inventor: John A. Kozel, 34 Walnut Cir., Basking Ridge, N.J. 07920

[21] Appl. No.: 746,015

[22] Filed: Nov. 5, 1996

[51] Int. Cl.$^6$ .............................. B32B 3/06; B32B 17/12; B32B 27/04
[52] U.S. Cl. ................... 428/102; 428/293.7; 428/299.1
[58] Field of Search ................................ 428/102, 293.7, 428/299.1

[56] References Cited

U.S. PATENT DOCUMENTS

| | | | |
|---|---|---|---|
| 3,679,324 | 7/1972 | Stargardter | 416/229 |
| 4,255,478 | 3/1981 | Crane | 428/113 |
| 4,354,804 | 10/1982 | Cruzen | 416/230 |
| 4,413,860 | 11/1983 | Prescott | 301/63 |
| 4,627,791 | 12/1986 | Marshall | 416/132 |
| 5,308,228 | 5/1994 | Benoit et al. | 416/230 |

*Primary Examiner*—Robert W. Ramsuer
*Assistant Examiner*—Dominic Keating
*Attorney, Agent, or Firm*—Arthur Jacob

[57] ABSTRACT

An article of manufacture illustrated in the form of an impeller having a rotor extending in radial directions from a central axis to an outer periphery and a plurality of vanes unitary with the rotor and extending from the rotor in axial directions essentially parallel to the central axis, each vane having a length along an axial direction, is constructed of a structural composite including a plurality of layers of reinforcing fibers in a matrix of synthetic polymeric material, each layer extending essentially parallel to the radial directions, the layers being juxtaposed with one another along the axial direction, the reinforcing fibers of each layer being woven in a pattern essentially perpendicular to the central axis, and further reinforcing fibers extending in the axial directions and stitched through the juxtaposed layers, the further reinforcing fibers extending within each vane, along the length of each vane, essentially parallel to the length of the vanes.

56 Claims, 7 Drawing Sheets

CONSTRUCTION OF ARTICLES OF MANUFACTURE OF FIBER REINFORCED STRUCTURAL COMPOSITES

The present invention relates generally to the manufacture of mechanical component parts and pertains, more specifically, to the construction of articles of manufacture, and more particularly impellers, of fiber reinforced structural composites.

The use of fiber reinforced structural composites has become widespread in the manufacture of mechanical component parts. It is well known to construct a block of composite materials in which reinforcing fibers are arranged in a matrix of synthetic polymeric material, with the fibers oriented to provide optimum strength commensurate with the configuration of the mechanical component to be machined from the block.

The present invention provides a structural composite having an arrangement of reinforcing fibers in a matrix of synthetic polymeric materials for enabling an improvement in particular articles of manufacture, such as impellers, in which axially extending elements, such as impeller vanes, are unitary with a radially extending element, such as a rotor, in an effective one-piece construction of high strength and exceptional durability. As such, the present invention attains several objects and advantages, some of which are summarized as follows: Provides a structural composite of strength and durability, reinforced in directions commensurate with the configuration of the component constructed from the structural composite; enables the reinforcement of a mechanical component in three mutually perpendicular directions for enhanced strength and durability in mechanical components constructed from structural composites; provides an improved impeller construction in which the vanes of the impeller are unitary with the rotor of the impeller and extend parallel to the axis of rotation of the rotor, the impeller being manufactured from a structural composite; enables an impeller construction of improved strength and durability; provides an impeller having greater wear resistance for operation with more abrasive fluids; provides an impeller having greater resistance to corrosion; enables the economical manufacture of mechanical components, and especially impellers, of uniform high quality and having a rugged construction for exemplary performance over a relatively long service life.

The above objects and advantages, as well as further objects and advantages, are attained by the present invention which may be described briefly as an improvement in an article of manufacture and, in particular, an impeller, having a radial portion extending in radial directions from a central axis to another periphery and a plurality of axial portions unitary with the radial portion and extending from the radial portion in axial directions essentially parallel to the central axis, each axial portion having a length extending along the axial direction, the improvement comprising: a structural composite including a plurality of layers of reinforcing fibers in a matrix of synthetic polymeric material, each layer extending essentially parallel to the radial directions, the layers being juxtaposed with one another along the axial direction; the reinforcing fibers of each layer being woven in a pattern essentially perpendicular to the central axis, and further reinforcing fibers extending in the axial directions through the juxtaposed layers, the further reinforcing fibers extending within each axial portion, along the length of each axial portion, essentially parallel to the length of the axial portions, and into the radial portion. In addition, the present invention includes a method for making an article of manufacture and, in particular, an impeller, having a radial portion extending in radial directions from a central axis to an outer periphery and a plurality of axial portions unitary with the radial portion and extending from the radial portion in axial directions essentially parallel to the central axis, each axial portion having a length along an axial direction, the method comprising: stacking a plurality of laminae of reinforcing fibers in a matrix of synthetic polymeric material, such that each lamina extends essentially parallel to the radial directions, and the laminae are juxtaposed with one another along the axial direction in a stack extending essentially parallel to the central axis, with the reinforcing fibers of each lamina being woven in a pattern essentially perpendicular to the central axis; stitching further reinforcing fibers through the juxtaposed laminae in the stack, such that the further reinforcing fibers extend in the axial directions within the stack and are interspersed throughout the stack; compressing the stack of laminae in the axial direction; curing the compressed stack of laminae to establish a unitary block having a plurality of layers of reinforcing fibers and further reinforcing fibers in a matrix of synthetic polymeric material; and machining the block to establish the radial portion and axial portions, with the further reinforcing fibers extending within each axial portion, along the length of each axial portion, essentially parallel to the length of the axial portions, and into the radial portion.

BRIEF DESCRIPTION OF THE DRAWINGS

The invention will be understood more fully, while still further objects and advantages will become apparent, in the following detailed description of preferred embodiments of the invention illustrated in the accompanying drawing, in which.

DESCRIPTION OF THE PREFERRED EMBODIMENTS

Figure 1:
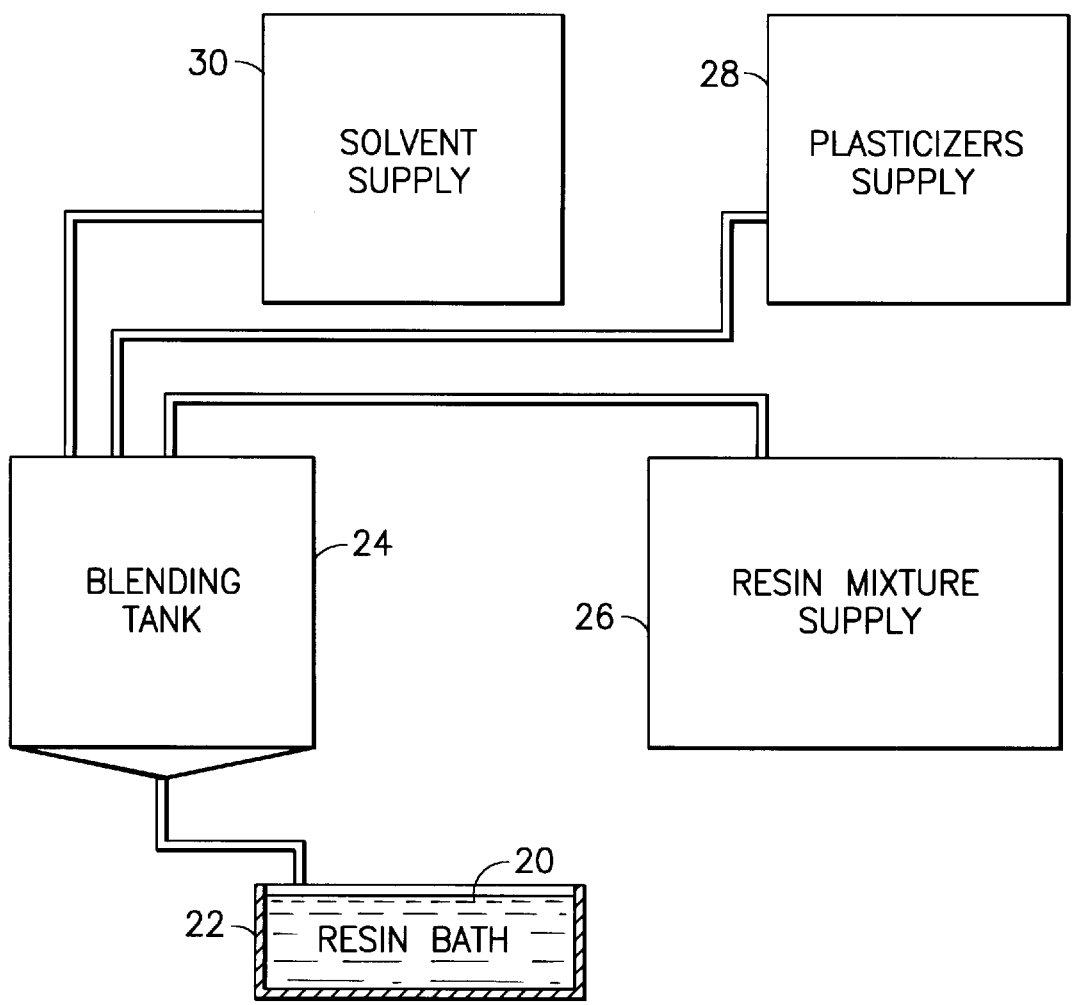
FIG. 1 is a diagrammatic view of a resin compounding arrangement used in connection with the present invention.

Referring now to the drawing, and especially to FIG. 1 thereof, a resin bath 20 is maintained in a resin pan 22, the resin bath 20 comprising a mixture of thermosetting epoxy and phenolic resins blended with suitable plasticizers and a solvent. A blending tank 24 is supplied with a resin mixture of about 65% by weight of epoxy resins and about 35% by weight of phenolic resins, the resin mixture being supplied from a resin supply 26. Likewise, plasticizers are supplied to the blending tank 24 from a plasticizers supply 28, and solvent is supplied from a solvent supply 30.

Figure 2:
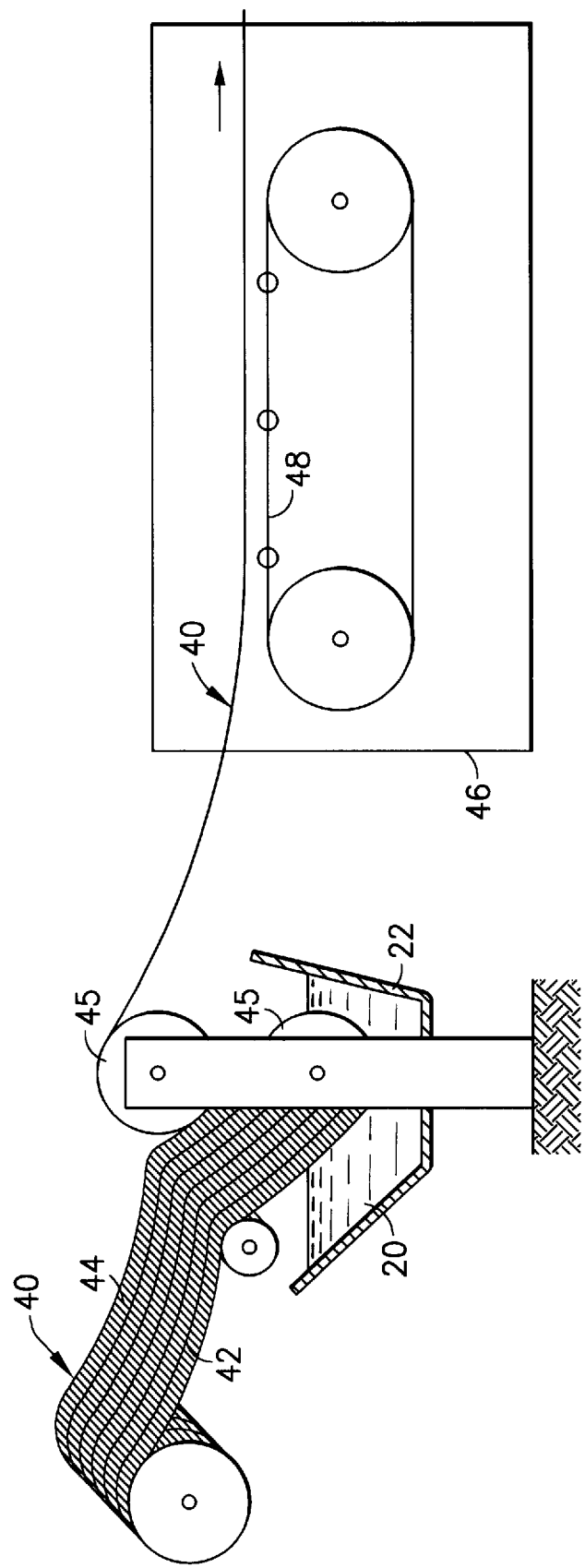
FIG. 2 is a diagrammatic view of an impregnating and treating arrangement used in connection with the present invention.
Figure 3:
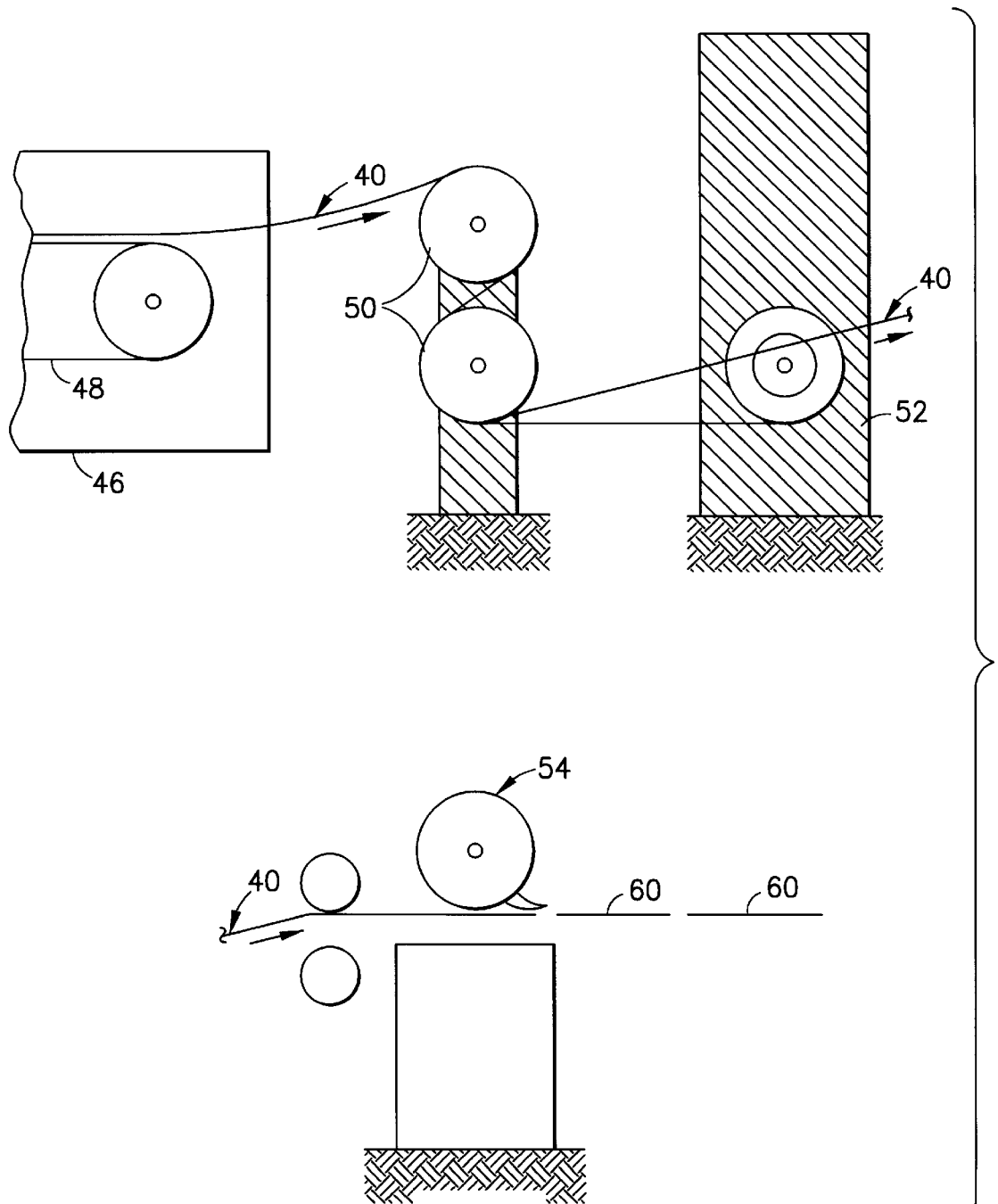
FIG. 3 is a diagrammatic view of a further operation used in connection with the present invention.

Turning now to FIG. 2, a continuous web 40 of graphite fibers 42 and 44 woven in an orthogonal pattern, with fibers 42 being oriented at 90° relative to fibers 44, is fed by metering rolls 45 through the resin bath 20 to impregnate the web 40 with the mixture of epoxy and phenolic resins. The resin impregnated web 40 is advanced to a heating and drying oven 46 where a carrier system 48 moves the web through the oven 46 to effect drying of the impregnated web 40 to a semi-cured state. Subsequently, the web 40 is passed to tension and cooling rolls 50 and a rewind stand 52, in a conventional web-feeding arrangement, to feed the resin-impregnated web 40 to a sheet cutter 54 where the web 40 is cut into individual laminae 60, each lamina 60 having fibers 42 extending longitudinally along the length of the lamina 60, as indicated by the direction X in FIG. 4, and fibers 44 extending laterally across the width of the lamina 60, as indicated by the direction Y in FIG. 4. In a similar process, laminae 62 are constructed with graphite fibers 42 and 44 woven in an orthogonal pattern, but with the orthogonal pattern rotated through an angular spacing A relative to the length and width of a lamina 62, the preferred angular spacing A being 45° so that in each lamina 62 the fibers 42 and 44 each extend at an angle of 45° to the X and Y directions, as illustrated. In another similar process, laminae 64 are constructed with glass fibers 66 and 68 woven in an orthogonal pattern and are impregnated with the mixture of epoxy and phenolic resins, as described above in connection with the manufacture of laminae 60, to construct glass fiber reinforced laminae 64.

Figure 4:
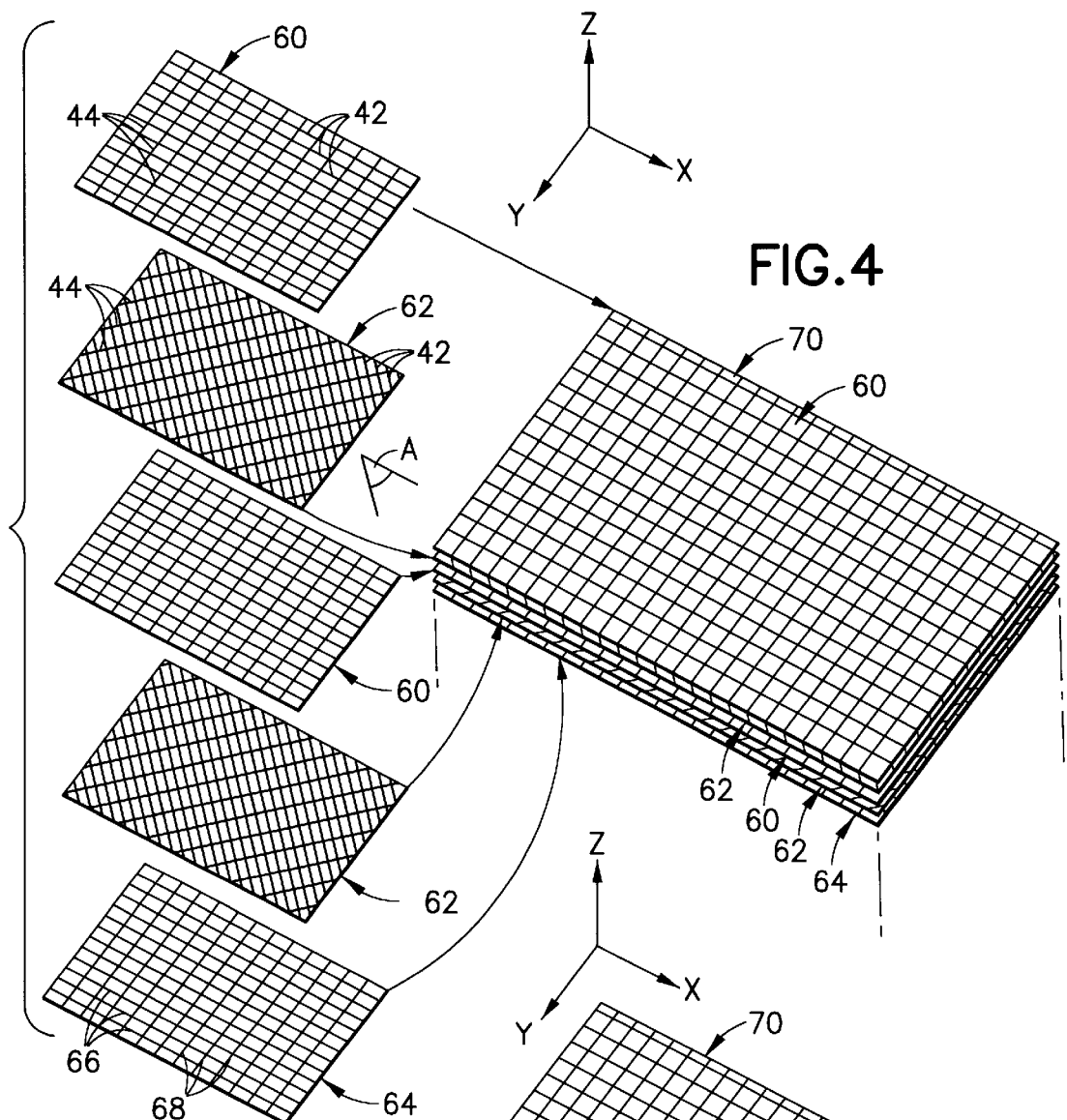
FIG. 4 is a diagrammatic illustration of procedures carried out in accordance with the present invention.

As shown in FIG. 4, the laminae 60, 62 and 64 are laid up in a stack 70, arranged in a repetitive sequence of a plurality of laminae 60 and 62 followed by at least one lamina 64. Thus, within the stack 70 of adjacent laminae 60, 62 and 64, a first lamina, in the form of a lamina 60 is followed by a second lamina, in the form of a lamina 62 which, in turn, is followed by a third lamina, in the form of a lamina 60, a fourth lamina in the form of a lamina 62 and a fifth lamina in the form of a lamina 64, establishing the preferred arrangement of four alternating graphite fiber reinforced laminae 60 and 62 followed by one glass fiber reinforced lamina 64, in each sequence, with the sequence being repeated throughout the stack 70, as shown. In the illustrated embodiment, the laminae 60, 62 and 64 have a length and a width of about four feet, and the stack 70 has a height, along the Z direction, selected upon the basis of the desired height in the completed article of manufacture, as will be described below.

Figure 5:
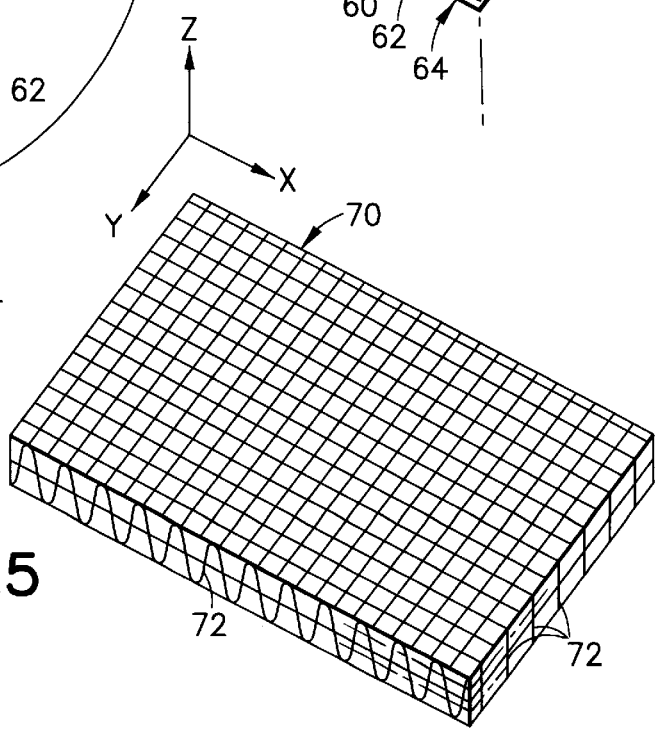
FIG. 5 is a diagrammatic illustration of a further procedure carried out in accordance with the present invention.
Figure 6:
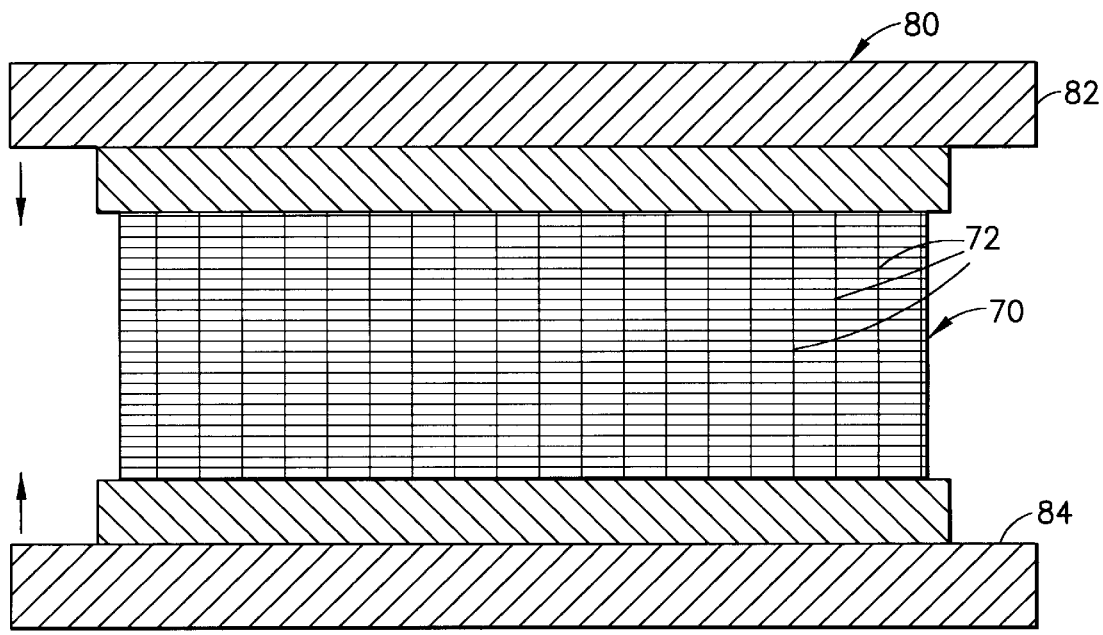
FIG. 6 is a diagrammatic illustration of a still further procedure carried out in accordance with the present invention.

Once the stacking operation is completed, the laminae 60, 62 and 64 are stitched together with graphite fibers 72 extending in the Z direction, as shown in FIG. 5. The stitching fibers 72 extend throughout the length and width of the stacked laminae 60, 62 and 64 and are interspersed among the reinforcing fibers 42, 44, 66 and 68 to provide reinforcement throughout the completed stack 70, essentially parallel to the height of the stack 70, in Z directions. In addition, the stitching provided by the fibers 72 secures together the laminae 60, 62 and 64 in the stack 70. The stack 70 then is placed in a press 80, as illustrated in FIG. 6, between platens 82 and 84, and then is compressed and cured, at a preferred pressure of about 2,000 psi and a preferred temperature of about 550° F. The resulting block 90 of composite material, illustrated in FIG. 7, has a height along the Z direction which is approximately one-half the height of the stack 70. Accordingly, the stack 70 is constructed with a height approximately twice that desired in the completed block 90. The curing time in the press 80 is about two hours per inch of the height of the completed block 90 along the Z direction. For example, a block 90 having a length and width of four feet and a height of eight inches requires a stack 70 of sixteen inches and a curing time in press 80 of approximately sixteen hours. Typically, a block 90 with a length and width of four feet can have a height of from one inch to forty-eight inches; however, other dimensions are feasible. The volume of reinforcing fibers 42, 44, 66, 68 and 72 is about 55% to about 58% of the volume of the block 90.

Figure 7:
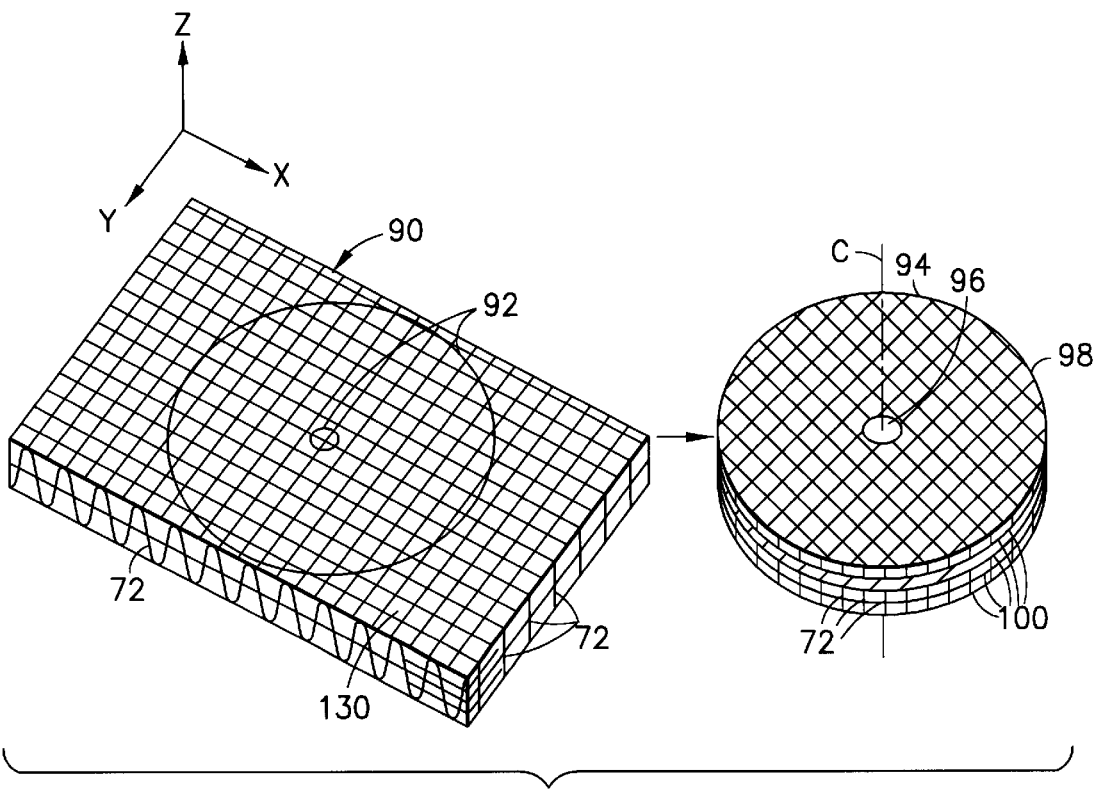
FIG. 7 is a diagrammatic illustration of yet another procedure carried out in accordance with the present invention.
Figure 8:
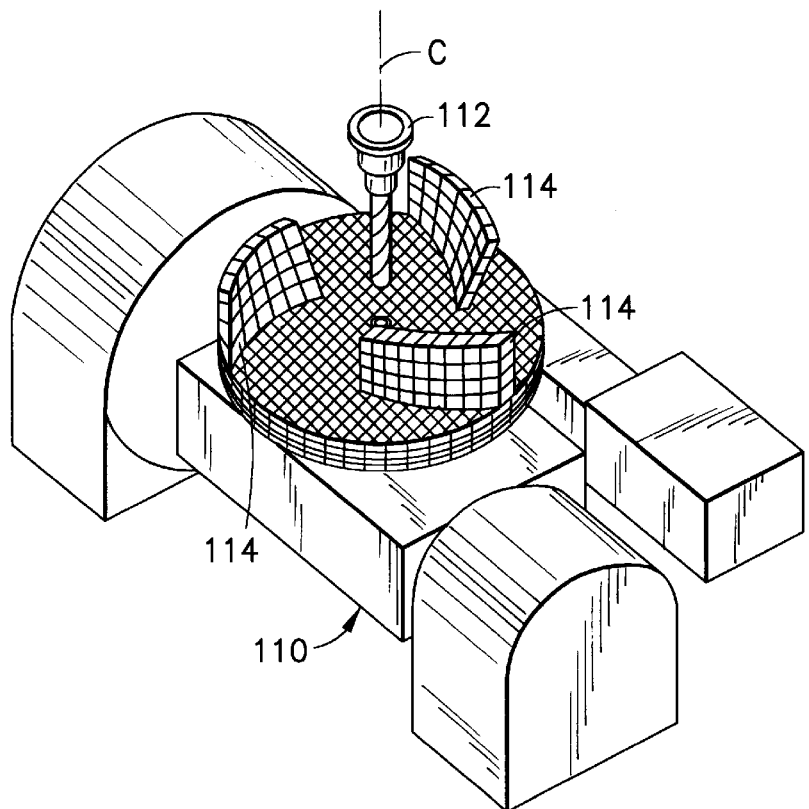
FIG. 8 is a diagrammatic illustration of still another operation carried out in accordance with the present invention.

Referring now to FIGS. 7 and 8, an article of manufacture is shown constructed in accordance with the present invention, the article of manufacture being illustrated in the form of an improved impeller. As seen in FIG. 7, the block 90 of composite material has been removed from the press 80 and marked at 92 with the outline of a blank to be cut from the block. A blank 94 then is cut from the block 90, the blank being provided with a central opening 96 along a central axis C and extending radially from the central axis C to an outer periphery 98. Blank 94 includes a plurality of layers 100 corresponding to the laminae 60, 62 and 64 used in the construction of the blank 94. In addition, the reinforcing fibers 72 extend essentially parallel to the Z direction throughout the blank 94.

Figure 9:
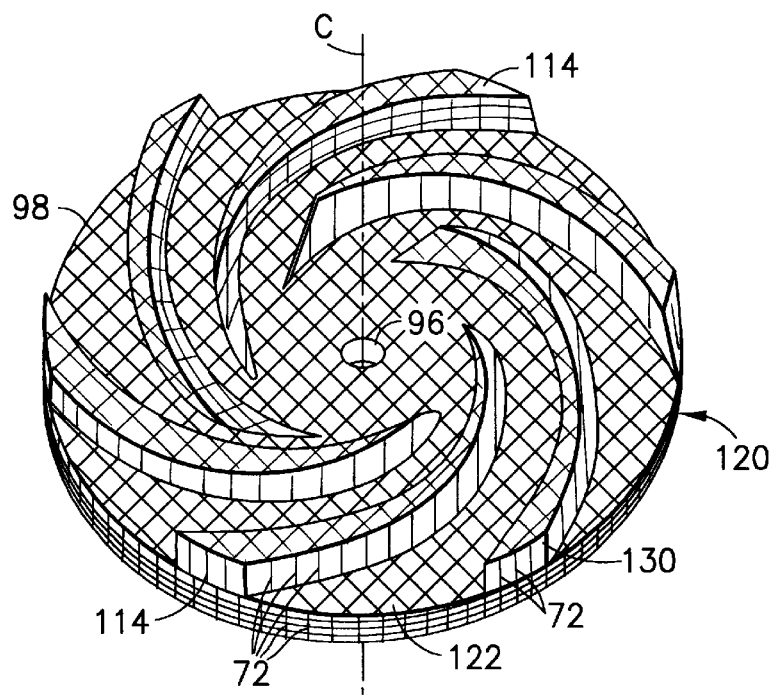
FIG. 9 is a largely diagrammatic perspective view of an impeller constructed in accordance with the present invention.
Figure 10:
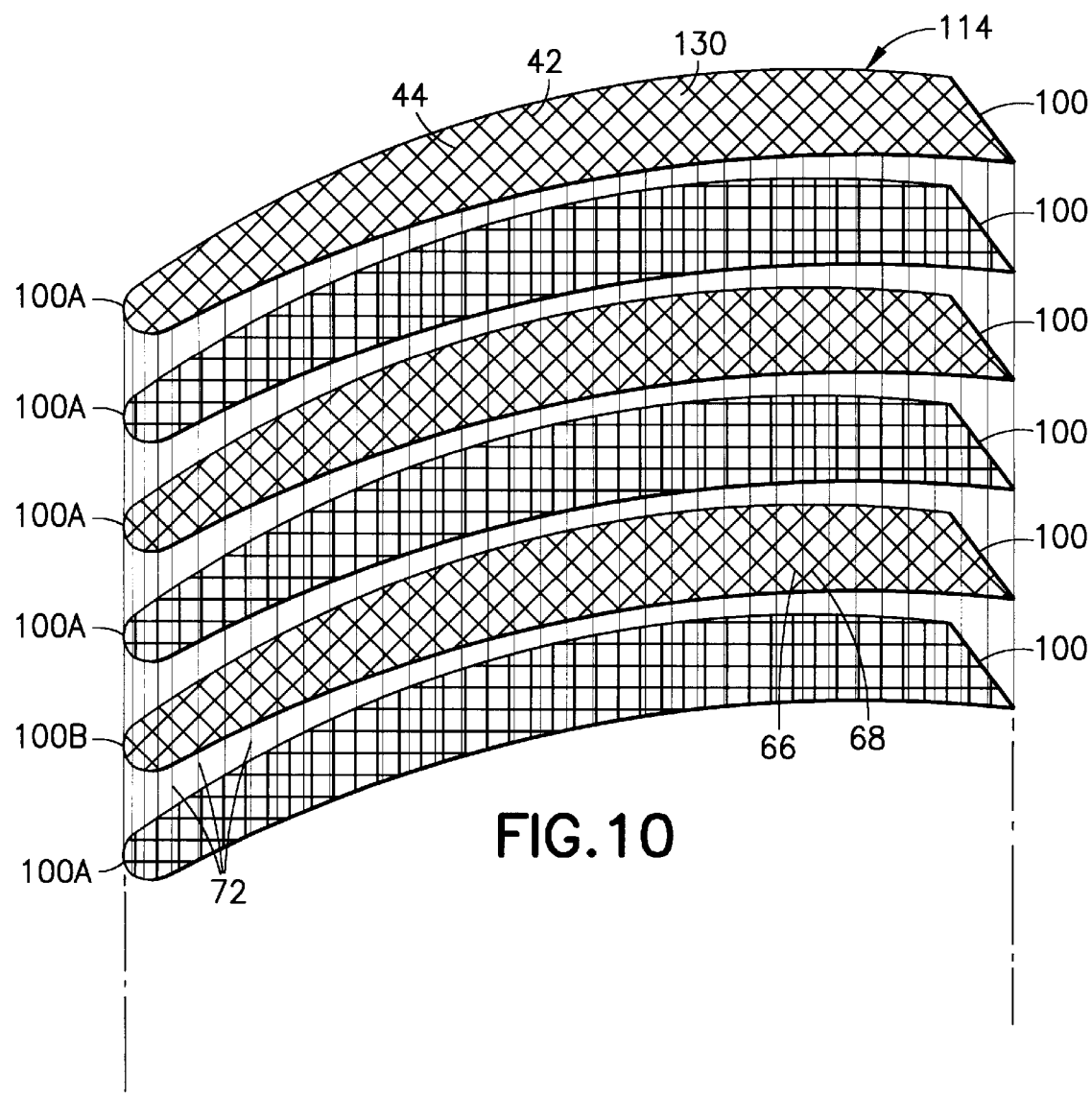
FIG. 10 is diagrammatic illustration of a portion of the impeller of FIG. 9, exploded to show details of construction.

Turning now to FIG. 8, the blank 92 is placed in a five-axis computerized numerically controlled (CNC) machining apparatus 110 where a computer controlled cutter 112 machines axial portions in the form of impeller vanes 114 which extend in axial directions essentially parallel to the central axis C. For purposes of clarity, not all of the vanes 114 are illustrated in FIG. 8. Upon completion of the machining operation, an impeller 120 is created with several vanes 114 extending axially from a radial portion in the form of a rotor 122 which extends in radial directions from central opening 96, as shown in FIG. 9. The vanes 114 are unitary with the rotor 122 in a structural composite having the plurality of layers 100 of reinforcing fibers in a matrix 130 of synthetic polymeric material, each layer extending essentially parallel to the radial directions, with the layers being juxtaposed with one another along the axial direction. As best seen in FIG. 10, which diagrammatically illustrates the layers 100 within a vane 114, expanded in the Z direction to show the orientation and relative positions of the layers 100 in each vane 114, the pattern of reinforcing fibers 42 and 44 follows the pattern established in the stack 70; that is, the pattern of the reinforcing fibers 42 and 44 in each layer 100 is an orthogonal pattern and the reinforcing fibers 42 and 44 in each layer 100 is rotated about the central axis C, preferably by 45°, relative to the next adjacent layer 100. The further reinforcing fibers 72 extend in the axial directions and are stitched through the juxtaposed layers 100, the further reinforcing fibers 72 extending within each vane 114, along the length of each vane 114, essentially parallel to the length of the vanes 114, and into the rotor 122 so as to reinforce each vane 114 and the integration of the vanes 114 and the rotor 122. The reinforcing fibers 42, 44, 66 and 68 of each layer 100 and the further reinforcing fibers 72 preferably are mutually perpendicular.

The sequence of layers in the completed impeller 120 follows the sequence established in the stack 70 by the laminae 60, 62 and 64. Thus, in addition to each layer 100 being rotated about the central axis C, preferably by 45°, relative to the next adjacent layer 100, layers 100 are divided into first layers 100A having graphite fibers 42 and 44 and second layers 100B having glass fibers 66 and 68. In the preferred arrangement illustrated herein, each repetitive sequence includes four first layers 100A followed by one second layer 100B. The reinforcing fibers 42, 44, 66, 68 and 72 are embedded in matrix 130 of mixed epoxy and phenolic resins and the volume of reinforcing fibers 42, 44, 66, 68 and 72 is about 55% to about 58% of the volume of the impeller 120. The impeller 120 is completed by conventional machining operations to shape the outer periphery 98, and to finish other details of construction.

The unitary, composite construction of the impeller 120 establishes a mechanical component part of high strength and exceptional durability. The nature of the composite material enables a high degree of resistance to wear, abrasion and corrosion. The mutually perpendicular arrangement of the reinforcing fibers 42, 44, 66, 68 and 72 in the matrix 130 of synthetic polymeric material, and especially the fibers 72 extending axially along the vanes 114, and into rotor 122, provides added strength and rigidity for exemplary performance, as well as increased durability for a long service life.

It will be apparent that the present invention attains the objects and advantages summarized above, namely: Provides a structural composite of strength and durability, reinforced in directions commensurate with the configuration of the component constructed from the structural composite; enables the reinforcement of a mechanical component in three mutually perpendicular directions for enhanced strength and durability in mechanical components constructed from structural composites; provides an improved impeller construction in which the vanes of the impeller are unitary with the rotor of the impeller and extend parallel to the axis of rotation of the rotor, the impeller being manufactured from a structural composite; enables an impeller construction of improved strength and durability; provides an impeller having greater wear resistance for operation with more abrasive fluids; provides an impeller having greater resistance to corrosion; enables the economical manufacture of mechanical components, and especially impellers, of uniform high quality and having a rugged construction for exemplary performance over a relatively long service life.

It is to be understood that the above detailed description of preferred embodiments of the invention are provided by way of example only. Various details of design, construction and procedure may be modified without departing from the true spirit and scope of the invention, as set forth in the appended claims.

The embodiments of the invention in which an exclusive property or privilege is claimed are defined as follows:

1. An improvement in an impeller having a rotor extending in radial directions from a central axis to an outer periphery and a plurality of vanes unitary with the rotor and extending from the rotor in axial directions essentially parallel to the central axis, each vane having a length along an axial direction, the improvement comprising:

a structural composite including a plurality of layers of reinforcing fibers in a matrix of synthetic polymeric material, each layer extending essentially parallel to the radial directions, the layers being juxtaposed with one another along the axial direction;

the reinforcing fibers of each layer being woven in a pattern essentially perpendicular to the central axis, and further reinforcing fibers extending in the axial directions through the juxtaposed layers, the further reinforcing fibers extending within each vane, along the length of each vane, essentially parallel to the length of the vanes, and into the rotor.

2. The invention of claim 1 wherein the pattern of the reinforcing fibers in each layer is an orthogonal pattern, and the reinforcing fibers of each layer and the further reinforcing fibers are mutually perpendicular.

3. The invention of claim 2 wherein the pattern of reinforcing fibers in each layer is rotated about the central axis through an angular spacing relative to the next adjacent layer.

4. The invention of claim 3 wherein the angular spacing is about 45°.

5. The invention of claim 1 wherein the layers include first layers in which the reinforcing fibers are of a first material and second layers in which the reinforcing fibers are of a second material.

6. The invention of claim 5 wherein the first and second layers are arranged in a repetitive sequence including a plurality of first layers followed by at least one second layer.

7. The invention of claim 5 wherein the first and second layers are arranged in a repetitive sequence including four first layers followed by one second layer.

8. The invention of claim 7 wherein the material of the reinforcing fibers of each first layer is graphite.

9. The invention of claim 8 wherein the material of the reinforcing fibers of the each second layer is glass.

10. The invention of claim 9 wherein the further reinforcing fibers are of graphite.

11. The invention of claim 10 wherein the matrix of synthetic polymeric material is a mixture of epoxy and phenolic resins.

12. The invention of claim 11 wherein the mixture of epoxy and phenolic resins is approximately 65% by volume of epoxy resin and 35% by volume of phenolic resin.

13. The invention of claim 11 wherein the structural composite has a volume, and the volume of reinforcing fibers is about 55% to about 58% of the volume of the structural composite.

14. An improvement in an article of manufacture having a radial portion extending in radial directions from a central axis to another periphery and a plurality of axial portions unitary with the radial portion and extending from the radial portion in axial directions essentially parallel to the central axis, each axial portion having a length extending along the axial direction, the improvement comprising:

a structural composite including a plurality of layers of reinforcing fibers in a matrix of synthetic polymeric material, each layer extending essentially parallel to the radial directions, the layers being juxtaposed with one another along the axial direction;

the reinforcing fibers of each layer being woven in a pattern essentially perpendicular to the central axis, and further reinforcing fibers extending in the axial directions through the juxtaposed layers, the further reinforcing fibers extending within each axial portion, along the length of each axial portion, essentially parallel to the length of the axial portions, and into the radial portion.

15. The invention of claim 14 wherein the pattern of the reinforcing fibers in each layer is an orthogonal pattern, and the reinforcing fibers of each layer and the further reinforcing fibers are mutually perpendicular.

16. The invention of claim 15 wherein the pattern of reinforcing fibers in each layer is rotated about the central axis through an angular spacing relative to the next adjacent layer.

17. The invention of claim 16 wherein the angular spacing is about 45°.

18. The invention of claim 14 wherein the layers include first layers in which the reinforcing fibers are of a first material and second layers in which the reinforcing fibers are of a second material.

19. The invention of claim 18 wherein the first and second layers are arranged in a repetitive sequence including a plurality of first layers followed by at least one second layer.

20. The invention of claim 18 wherein the first and second layers are arranged in a repetitive sequence including four first layers followed by one second layer.

21. The invention of claim 20 wherein the material of the reinforcing fibers of each first layer is graphite.

22. The invention of claim 21 wherein the material of the reinforcing fibers of the each second layer is glass.

23. The invention of claim 22 wherein the further reinforcing fibers are of graphite.

24. The invention of claim 23 wherein the matrix of synthetic polymeric material is a mixture of epoxy and phenolic resins.

25. The invention of claim 24 wherein the mixture of epoxy and phenolic resins is approximately 65% by volume of epoxy resin and 35% by volume of phenolic resin.

26. The invention of claim 24 wherein the structural composite has a volume, and the volume of reinforcing fibers is about 55% to about 58% of the volume of the structural composite.

27. A method for making an impeller having a rotor extending in radial directions from a central axis to an outer periphery and a plurality of vanes unitary with the rotor and extending from the rotor in axial directions essentially parallel to the central axis, each vane having a length along an axial direction, the method comprising:

stacking a plurality of laminae of reinforcing fibers in a matrix of synthetic polymeric material, such that each lamina extends essentially parallel to the radial directions, and the laminae are juxtaposed with one another along the axial direction in a stack extending essentially parallel to the central axis, with the reinforcing fibers of each lamina being woven in a pattern essentially perpendicular to the central axis;

stitching further reinforcing fibers through the juxtaposed laminae in the stack, such that the further reinforcing fibers extend in the axial directions within the stack and are interspersed throughout the stack;

compressing the stack of laminae in the axial direction;

curing the compressed stack of laminae to establish a unitary block having a plurality of layers of reinforcing fibers and further reinforcing fibers in a matrix of synthetic polymeric material; and machining the block to establish the rotor and vanes, with the further reinforcing fibers extending within each vane, along the length of each vane, essentially parallel to the length of the vanes, and into the rotor.

28. The invention of claim 27 wherein the stitching of the further reinforcing fibers is such that the juxtaposed laminae are secured together in the stack.

29. The invention of claim 27 wherein the stack of laminae has a height and the block has an axial thickness, and the stack of laminae is compressed such that the axial thickness of the block is about one-half the height of the stack of laminae.

30. The invention of claim 27 wherein the pattern of the reinforcing fibers in each layer is an orthogonal pattern, and the reinforcing fibers of each layer and the further reinforcing fibers are mutually perpendicular.

31. The invention of claim 30 wherein the pattern of reinforcing fibers in each layer is rotated about the central axis through an angular spacing relative to the next adjacent layer.

32. The invention of claim 31 wherein the angular spacing is about 45°.

33. The invention of claim 27 wherein the layers include first layers in which the reinforcing fibers are of a first material and second layers in which the reinforcing fibers are of a second material.

34. The invention of claim 33 wherein the first and second layers are arranged in a repetitive sequence including a plurality of first layers followed by at least one second layer.

35. The invention of claim 27 wherein the first and second layers are arranged in a repetitive sequence including four first layers followed by one second layer.

36. The invention of claim 35 wherein the material of the reinforcing fibers of each first layer is graphite.

37. The invention of claim 36 wherein the material of the reinforcing fibers of the each second layer is glass.

38. The invention of claim 37 wherein the further reinforcing fibers are of graphite.

39. The invention of claim 38 wherein the matrix of synthetic polymeric material is a mixture of epoxy and phenolic resins.

40. The invention of claim 39 wherein the mixture of epoxy and phenolic resins is approximately 65% by volume of epoxy resin and 35% by volume of phenolic resin.

41. The invention of claim 39 wherein the block has a volume, and the volume of reinforcing fibers is about 55% to about 58% of the volume of the block.

42. A method for making an article of manufacture having a radial portion extending in radial directions from a central axis to an outer periphery and a plurality of axial portions unitary with the radial portion and extending from the radial portion in axial directions essentially parallel to the central axis, each axial portion having a length along an axial direction, the method comprising:

stacking a plurality of laminae of reinforcing fibers in a matrix of synthetic polymeric material, such that each lamina extends essentially parallel to the radial directions, and the laminae are juxtaposed with one another along the axial direction in a stack extending essentially parallel to the central axis, with the reinforcing fibers of each lamina being woven in a pattern essentially perpendicular to the central axis;

stitching further reinforcing fibers through the juxtaposed laminae in the stack, such that the further reinforcing fibers extend in the axial directions within the stack and are interspersed throughout the stack;

compressing the stack of laminae in the axial direction;

curing the compressed stack of laminae to establish a unitary block having a plurality of layers of reinforcing fibers and further reinforcing fibers in a matrix of synthetic polymeric material; and machining the block to establish the radial portion and axial portions, with the further reinforcing fibers extending within each axial portion, along the length of each axial portion, essentially parallel to the length of the axial portions, and into the radial portion.

43. The invention of claim 42 wherein the stitching of the further reinforcing fibers is such that the juxtaposed laminae are secured together in the stack.

44. The invention of claim 42 wherein the stack of laminae has a height and the block has an axial thickness, and the stack of laminae is compressed such that the axial thickness of the block is about one-half the height of the stack of laminae.

45. The invention of claim 42 wherein the pattern of the reinforcing fibers in each layer is an orthogonal pattern, and the reinforcing fibers of each layer and the further reinforcing fibers are mutually perpendicular.

46. The invention of claim 45 wherein the pattern of reinforcing fibers in each layer is rotated about the central axis through an angular spacing relative to the next adjacent layer.

47. The invention of claim 46 wherein the angular spacing is about 45°.

48. The invention of claim 42 wherein the layers include first layers in which the reinforcing fibers are of a first material and second layers in which the reinforcing fibers are of a second material.

49. The invention of claim 47 wherein the first and second layers are arranged in a repetitive sequence including a plurality of first layers followed by at least one second layer.

50. The invention of claim 42 wherein the first and second layers are arranged in a repetitive sequence including four first layers followed by one second layer.

51. The invention of claim 49 wherein the material of the reinforcing fibers of each first layer is graphite.

52. The invention of claim 51 wherein the material of the reinforcing fibers of the each second layer is glass.

53. The invention of claim 52 wherein the further reinforcing fibers are of graphite.

54. The invention of claim 53 wherein the matrix of synthetic polymeric material is a mixture of epoxy and phenolic resins.

55. The invention of claim 54 wherein the mixture of epoxy and phenolic resins is approximately 65% by volume of epoxy resin and 35% by volume of phenolic resin.

56. The invention of claim 54 wherein the block has a volume, and the volume of reinforcing fibers is about 55% to about 58% of the volume of the block.

* * * * *